I. J. THOMPSON.
ANTISKID DEVICE.
APPLICATION FILED OCT. 23, 1919.

1,389,607.

Patented Sept. 6, 1921.
2 SHEETS—SHEET 1.

Inventor
Ida J. Thompson,
By Lancaster and Allwine
Attorneys

I. J. THOMPSON.
ANTISKID DEVICE.
APPLICATION FILED OCT. 23, 1919.
1,389,607.
Patented Sept. 6, 1921.
2 SHEETS—SHEET 2.
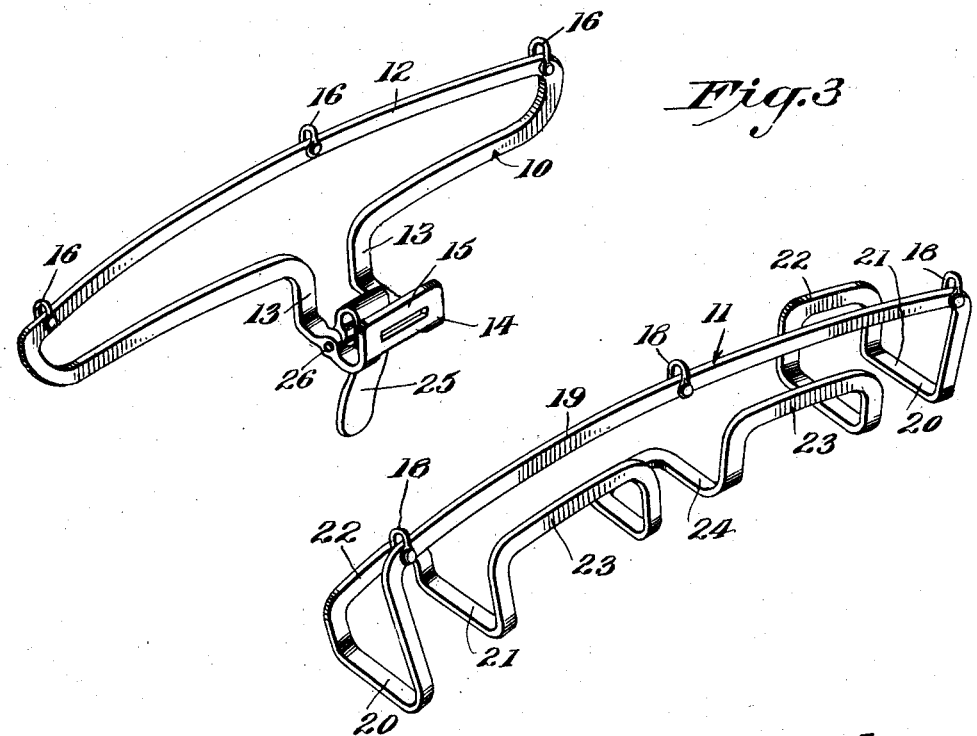
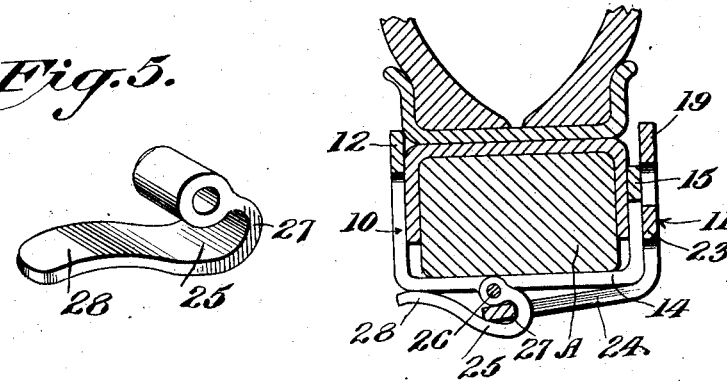
Inventor
Ida J. Thompson

UNITED STATES PATENT OFFICE.

IDA J. THOMPSON, OF LINCOLN, NEBRASKA.

ANTISKID DEVICE.

1,389,607.   Specification of Letters Patent.   Patented Sept. 6, 1921.

Application filed October 23, 1919. Serial No. 332,704.

*To all whom it may concern:*

Be it known that I, IDA J. THOMPSON, a citizen of the United States, residing at Lincoln, in the county of Lancaster and State of Nebraska, have invented certain new and useful Improvements in Antiskid Devices, of which the following is a specification.

This invention relates to an emergency antiskid chain attachment for pneumatic tires, and an object of the invention is to provide a unit comprising suitable attaching members having a plurality of chains attached thereto and adapted to extend transversely across the tread portion of a pneumatic tire to prevent the tire from slipping or skidding when traveling over slick surfaces.

Another object of this invention is to provide an anti-skid attachment for pneumatic tires as specified, which may be quickly and easily attached to or detached from the felly of a vehicle wheel carrying an ordinary pneumatic tire, the said device comprising attaching members one of which carries a pivotally mounted locking member adapted to engage through a loop formed upon the other member, each of which members are adapted to engage alongside of the felly of a vehicle wheel, and one of which members is provided with laterally extending loops adjacent its end portion, the ends of which loops are upturned for engagement against the side of the wheel felly opposite that against which the main portion thereof engages.

Other objects of the invention will appear in the following detailed description taken in connection with the accompanying drawing, forming a part of this specification and in which drawing:

Fig. 3 is a detail perspective view of the attaching portions of the device showing them disconnected.

Fig. 4 is a transverse section through a device taken on the line 4—4 of Fig. 1.

Fig. 5 is a detail perspective view of the locking member; and

Figure 6:
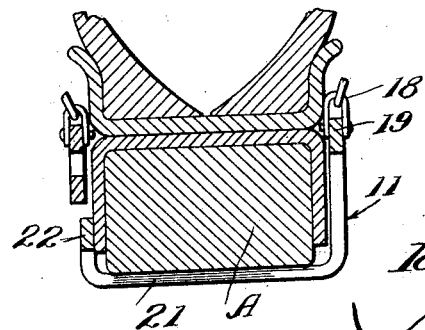
Fig. 6 is a cross section taken on the line 6—6 of Fig. 1.

Referring more particularly to the drawings, wherein like characters indicate like and corresponding parts throughout the several views, the attaching portion of the improved anti-skid device, comprises sections 10 and 11, each of which is preferably formed of bar metal, such as malleable iron or the like, in skeleton form. The sections 10 of the attaching structure comprise a chain carrying bar 12 which is curved longitudinally to conform to the circumferential curvature of a wheel felly as indicated at A and this chain carrying bar 12 is turned downwardly at its ends and returned, beneath the bar 12 to the transverse center of the section 10 where it is bent downwardly as shown at 13 and outwardly to form a substantially horizontal U-shaped portion 14, the terminal or bight portion 15 of which is upturned, for engagement against the side of the wheel felly opposite the side engaged by the chain carrying bar 12. The chain carrying bar 12 has a plurality of clevises 16 pivotally connected thereto, to which the chains 17 are attached. When the device is mounted about or upon a vehicle wheel the chains 17 are adapted to extend transversely across the tire B, and they are connected, at their ends remote from the ends connected to the clevises 16, to clevises 18 which are carried by the chain carrying bar 19 of the section 11. This chain carrying bar 19 like the chain carrying bar 12 is curved longitudinally to conform to the circumferential curvature of the wheel A and is made of bar metal in skeleton form, having its ends downturned and connected to the outermost legs 20 of the transversely extending U-shaped members 21. The bight portions or outer end portions 22 of the U-shaped members 21 are upturned as clearly shown in Figs. 3 and 6 of the drawings. These upturned ends or bight portions 22 are adapted to engage the wheel felly A, at the side which is engaged by the bar 12, of the section 10 and oppositely to the side which is engaged by the bar 19 of the section 11. The strip of metal of which the section 11 is formed is bent to form vertically extending substantially inverted U-shaped portions 23, adjacent the substantially horizontal U-shaped members 21, which engage against the sides of the wheel felly engaged by the bar 19. A relatively short horizontal U-shaped portion 24 is formed intermediate the vertical U-shaped sections 23 and forms means for co-action with the pivoted latch 25 to securely connect the sections 10 and 11 to a wheel felly. The pivoted latch lever 25 is pivotally connected by means of a pin 26 to the legs of the U-shaped portion 14, as clearly shown in Figs. 3 and 4 of the drawings. This latch lever 25 is bent to provide a curved portion 27, and an arcuate thumb rest or operating lever 28 so that when the catch is inserted through the U-shaped portion 24 and against the bight portion thereof which latter bight portion will act as a fulcrum for the latch lever 25 intermediate its pivot and its thumb or leverage end 28, to permit the clamping of the sections 10 and 11 securely against the wheel felly A and during the pivotal movement of the latch lever, a cam action will be obtained which when the convexed portion of the arcuate lever or thumb rest portion thereof is brought into engagement with the inner periphery of the wheel felly, the members 10 and 11 will be securely connected or locked in binding engagement upon the wheel felly A, with the chains 17 extending transversely across the tire B.

Figure 1:
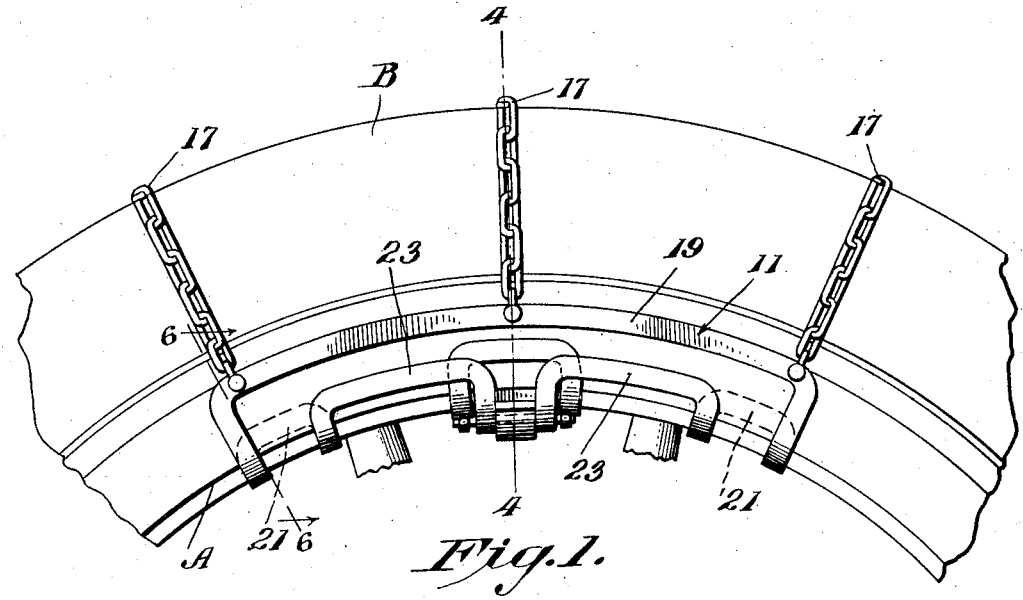
Figure 1 is a side elevation of the improved anti-skid attachment showing the same applied to a fragment of a vehicle wheel.
Figure 2:
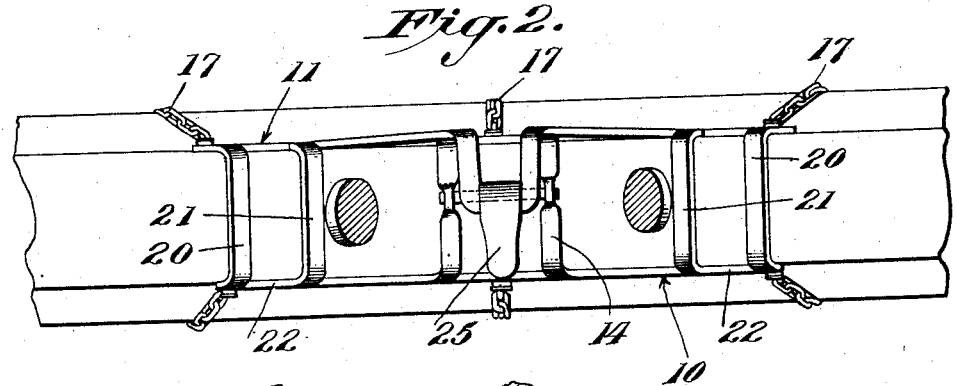
Fig. 2 is a plan view looking at the inner periphery of a wheel felly showing the improved attachment applied thereto.

In use, any number of the improved anti-skid devices may be attached to a vehicle wheel, this depending upon the desires of the user, and it will be readily apparent from the foregoing description taken in connection with the accompanying drawings, that these anti-skid devices may be attached to the wheel structure without necessitating the jacking up or raising of the wheel and also they may be attached to certain types of wheels without the necessity of the person attaching them alighting from the vehicle carrying the wheel. Any desired number of the chains 17 may be connected to the bars 12 and 19 as desired, without departing from the spirit of this invention. However, it is preferable to attach one chain adjacent each end of the bars and one intermediate the ends as clearly shown in Figs. 1 and 2 of the drawings.

Changes in details may be made without departing from the spirit of this invention, but,

I claim:

1. In an anti-skid device, the combination, with a vehicle wheel including a felly and tire, of a pair of felly engaging members, tractive elements carried by said felly engaging members, each of said members adapted to engage both sides of a wheel felly, and means for detachably clamping said members together to support the tractive elements in engagement with the tire.

2. In an antiskid attachment for vehicle wheels, the combination of a pair of felly engaging members, chain carrying bars formed upon said members, tire engaging chains connected to said bars and extending from one member to the other, lateral extensions on each of said members adapted to engage entirely across the inner circumference of a wheel felly, and means co-acting with certain of said lateral extensions for clamping said members in firm engagement with a wheel felly.

3. In an anti-skid attachment for vehicle wheels, the combination of a pair of felly engaging members, chain carrying bars formed upon said members and curved to conform to the curvature of a wheel felly, tire engaging chains connected to said bars, lateral extensions on said members adapted to engage across the inner circumference of a wheel felly, said extensions having their free ends upturned for engagement against the sides of a wheel felly, and means for clamping said members in firm engagement with a wheel felly.

4. In an anti-skid attachment for vehicle wheels, the combination of a pair of felly engaging members, chain carrying bars formed upon said members, tire engaging chains connected to said bars and extending from one member to another, a lateral extension formed upon each of said members and adapted to engage across the inner circumference of a wheel felly, a locking lever carried by one of said lateral extensions, and adapted to engage through the lateral extensions of the other member for securely clamping the members in firm engagement with a wheel felly, and lateral extensions on one of said members adjacent its ends, said last named lateral extensions adapted to engage across the inner circumference of a wheel felly.

5. In an anti-skid attachment for vehicle wheels, the combination of a pair of felly engaging members, chain carrying bars formed upon said members, tire engaging chains connected to said bars and extending from one member to another, a lateral extension formed upon each of said members and adapted to engage across the inner circumference of a wheel felly, clamping means carried by one of said lateral extensions and adapted to engage the lateral extension of the other member for securely clamping the members in firm engagement with a wheel felly, lateral extensions on one of said members adjacent its ends, said last named lateral extensions adapted to engage across the inner circumference of a wheel felly, said last named lateral extensions having their ends up and adapted to engage the sides of a wheel felly, the free end of said latch lever carrying lateral extension being upturned and adapted to engage against the side of a wheel felly.

IDA J. THOMPSON.